March 5, 1968 S. C. W. WILKINSON 3,372,076
METHOD OF FORMING A FLEXIBLE BELLOWS CONNECTION BETWEEN
AXIALLY SPACED MEMBERS
Filed Jan. 31, 1964 2 Sheets-Sheet 2

United States Patent Office 3,372,076
Patented Mar. 5, 1968

3,372,076
METHOD OF FORMING A FLEXIBLE BELLOWS CONNECTION BETWEEN AXIALLY SPACED MEMBERS
Samuel Clifford Walter Wilkinson, Cookham, England, assignor to Crane Packing Limited, Slough, England, a British company
Filed Jan. 31, 1964, Ser. No. 341,714
Claims priority, application Great Britain, Feb. 6, 1963, 4,928/63
5 Claims. (Cl. 156—190)

ABSTRACT OF THE DISCLOSURE

A large-diameter bellows type seal or expansion joint is assembled in situ by spirally wrapping successive layers of different materials including fabric, rubberised fabric, plastics or fabric-reinforced plastics and also including a flexible profiled metal strip circumferentially around axially spaced members of the joint and securing the spirally wrapped material to the axially spaced members by suitable clamping means.

---

This invention relates to the formation of bellows, primarily for use in the construction of large mechanical face seals, but such bellows may also be used in forming flexible sections of pipework systems and for other purposes where a flexible cylindrical sealing member is required.

In the development of large diameter split mechanical shaft seals we have devised several designs incorporating sliding flexible members, but these suffer very serious disadvantages in that a considerable weight is suspended on the flexible member and also large split rings are extremely expensive to produce to the degree of accuracy required for efficient operation.

There is also the problem that in the case of large shaft diameters it is rarely the case that there is a demand for more than two or three of any given size, and therefore it is not a practical proposition to lay down, for example, rubber moulds to form rubber bellows, which would be one alternative to the sliding flexible member. There is a further problem that in most cases it is necessary to fit these large components without the facility of being able to pass them over the end of the shaft and therefore even a moulded bellows would have to be cut and welded or bonded in position, which is not a very practical proposition.

It is an aim of the invention to provide a method of producing an ideal bellows form for this type of application.

According to the invention it is proposed to form a flexible bellows assembly in situ by circumferentially wrapping in combination different layers comprising at least one strip of metal sheet or mesh and at least one layer of fabric or synthetic resin or rubber, or of fabric-reinforced synthetic resin or rubber. The metal strip can be pressed to a zig-zag section and, to give this section sufficient flexibility to bend round, it has transverse slots, slits or ribs cut or pressed in it. In a preferred arrangement there is an inner layer of metal, an intermediate fabric or synthetic resin layer, and an outer layer of metal.

In this way bellows of any desired diameter can be made. They may have a single convolution or several, according to the profile of the metal strip. The metal can be spring metal sheet, in which case the bellows can be used to apply a substantial axial force, for example the sealing force where the bellows are employed in a mechanical face seal.

This invention will now be further described by way of example with reference to the accompanying drawings in which.

Figure 1:
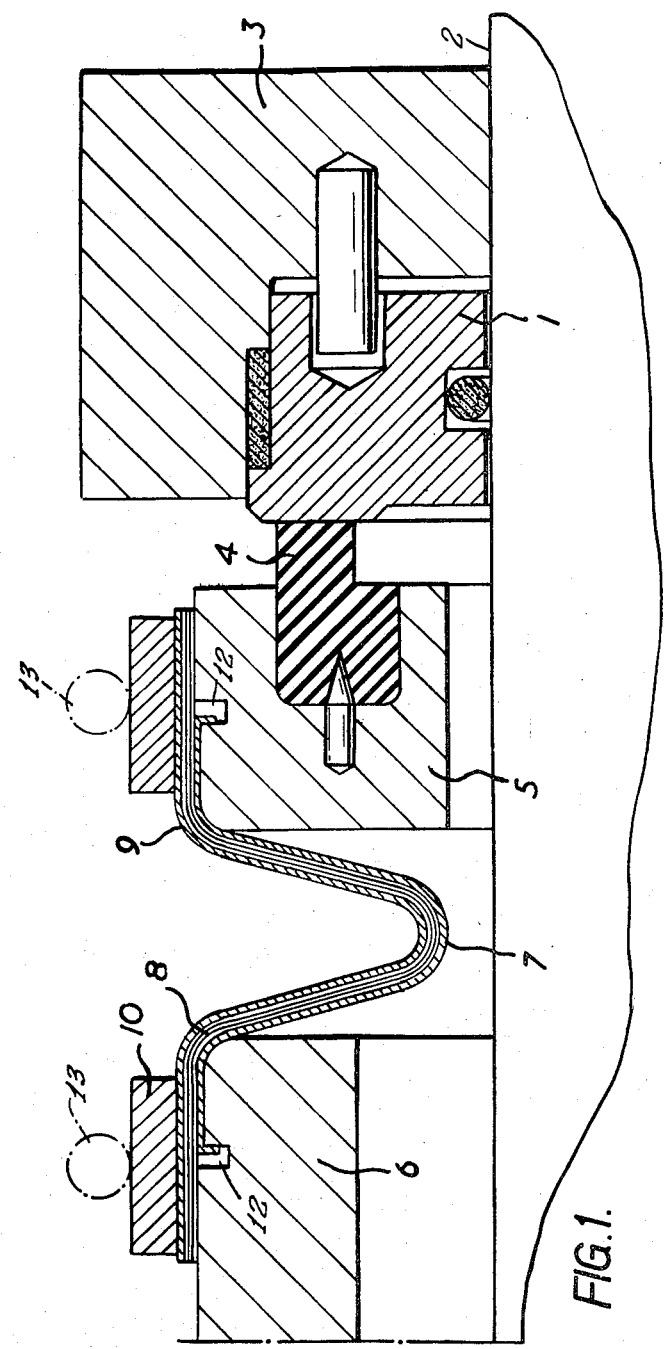
FIGURE 1 is an axial section through a mechanical face seal fitted on a large shaft, such as a ship's propeller shaft and embodying the bellows.

The seal illustrated in FIGURE 1 comprises a seat 1 of split construction, clamped directly on the propeller shaft 2 in a carrier 3 and engaged by a non-rotating seal face 4, which may be a hard carbon ring in a split metal carrier 5, or it may be made of other materials such as rubber or a reinforced synthetic resin.

The problem is to make this face assembly (4 and 5) free to float in relation to the stationary mounting, shown at 6, associated with the stern tube of the ship, so that it may accurately follow any relative shaft movement which commonly occurs in non-rigid structures such as a ship's hull. It is also necessary for a certain amount of axial movement to take place both to accommodate wear and also to accommodate differential expansion, and changes in the clearance in the thrust bearing resulting from ahead or astern running. To accommodate this movement a bellows assembly incorporating a spring is formed between the face carrier 5 and a suitable mounting ring 6 on the end of the stern tube. Both these members are provided with an annular groove in their outer surfaces.

In the simplest form first a spring ring 7 made of a suitably corrosion-resistant metal of a V form but with transverse slots 7a punched out of it to give it the necessary flexibility to allow it to be wrapped round the shaft, is positioned to allow its turned-down edges to be located in the two grooves 12, the two ends being brought together with a simple metal clip. This spring is then wrapped with either an extruded rubber or plastics section or a rubberised fabric sealing strip 8, the fabric being cut on the bias so that it will accurately follow the contour of the spring ring. One preferred form of strip is polyvinyl chloride reinforced with knitted cotton. This allows a certain amount of stretching of the sealing layer without tearing. This sealing layer is wrapped two or more times round the shaft, the ends being accurately cut to coincide with each other, and the outer end being held in position with a contact adhesive. This assembly is then wrapped with a further metal spring ring 9 of similar form to that used in the first part of the assembly, and this again is secured with metal clips (not shown). The ends of the assembly surrounding the mounting ring and the face are then secured with heavy metal strips 10, these being provided with suitable tensioning bolts (indicated in broken lines at 13) so that a considerable compression force can be applied which will compress the rubberised fabric or plastics layer to form a seal with the adjacent metal ring 9 on the outside of each location groove.

For light duties the assembly as described will form an adequate seal. For more severe duties it may be necessary to use for example a pressure sensitive adhesive between the layers of plastics or rubberised fabric, also the construction can readily be modified to accommodate higher pressures by incorporating more layers of sealing material and additional metal layers, there being for example four or five alternate rings of sealing material and metal strip in some cases.

In certain situations where the seal is exposed to contact with a corrosive liquid it is possible to cover the spring assembly with a layer of rubber either applied with adhesives or by extrusion around the spring section. There is also the possibility of protecting for example the fabric reinforced rubber interlay by first wrapping the spring assembly with unsintered or sintered polytetrafluoroethylene tape forming a barrier layer between the rubber and the spring on the side in contact with the liquid.

Figure 2:
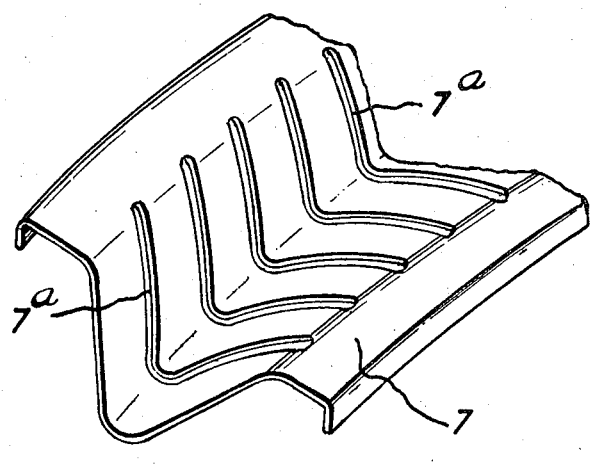
FIGURE 2 is a scrap perspective view of a portion of the pressed spring metal strip used in forming the bellows for the seal of FIG. 1.
Figure 3:
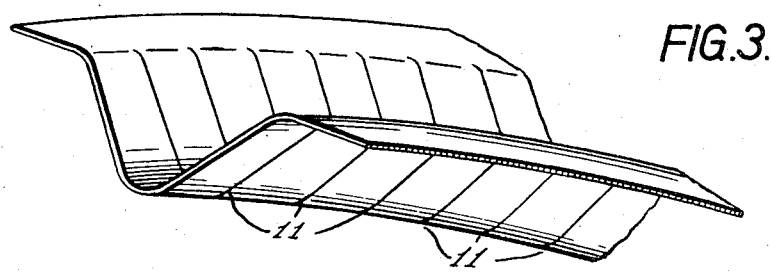
FIGURE 3 is a scrap perspective view of a portion of an alternative form of strip.
Figure 4:
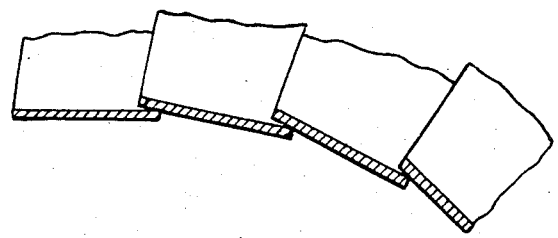
FIGURE 4 is a scrap longitudinal section through the strip of FIGURE 3.

Instead of giving the strip metal necessary flexibility by punching transverse slots out of it as shown in FIGURE 2, another possibility is to cut transverse slits in it, as shown at 11 in FIGURE 3 and then, when the strip is bent round in an arc to form bellows, the portions between the slits overlap in the manner of fish scales as shown in FIGURE 4. This has the advantage that no gaps are left through which the extruded rubber or plastics section might otherwise be forced under the pressure differential existing across the bellows in use.

Figure 5:
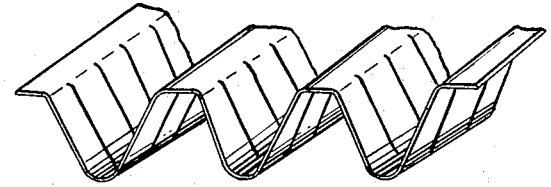
FIGURE 5 is a scrap perspective view of another possible form of strip, having more than one zig-zag.

Yet another possibility is to press transverse ribs into the strip instead of slots or slits, but this does not give such good flexibility.

Where it is required to allow for greater overall axial movement than can easily be provided by a single zig-zag or V section, the strip could embody several zig-zag or V portions, and in FIGURE 5 is shown an example with three. It is used in exactly the same way as the example described earlier.

I claim:
1. A method of forming an axially flexible fluid-tight bellows connection between first and second mutually axially spaced substantially coaxial hollow cylindrical bodies of similar diameters, the steps comprising: circumferentially wrapping around said bodies so as to bridge between them successive layers of preformed profiled flexible metal strip of constant undulating cross-section and of strips of other flexible sheet material, the lateral edges of each of said strips overlying circumferentially extending surfaces of said first and second bodies; applying axially spaced hoop sections over each of said edges to clamp said edges to the respective bodies; and circumferentially tensioning said hoops.

2. The method set forth in claim 1, wherein, in the wrapping of said layers, there is first wrapped a metal strip, then a plurality of layers of said other flexible sheet material, and finally a further layer of metal strip.

3. The method set forth in claim 13, wherein said preformed metal strip is provided with transversely extending gaps extending across the greater part of its width to give it flexibility.

4. The method set forth in claim 1, wherein the cylindrical surfaces of said first and second bodies are provided with circumferentially extending grooves, and including the step of inserting into said grooves the lateral edges of said profiled metal strip.

5. The method set forth in claim 1, wherein the said other flexible sheet material is a fabric-reinforced synthetic resin.

References Cited
UNITED STATES PATENTS

| | | | |
|---|---|---|---|
| 3,053,724 | 9/1962 | Galloway | 156—304 XR |
| 2,879,804 | 3/1959 | Hammond | 285—229 XR |
| 1,696,435 | 12/1928 | Fraley | 285—229 |
| 2,657,364 | 10/1953 | Carr | 138—121 XR |
| 2,578,140 | 12/1951 | Krupp et al. | 138—121 XR |
| 1,345,971 | 7/1920 | Star | 138—121 XR |
| 2,815,795 | 12/1957 | Vander Poel | 156—190 XR |

EARL M. BERGERT, *Primary Examiner.*

P. DIER, *Examiner.*